United States Patent
Brunner et al.

(10) Patent No.: US 9,007,485 B2
(45) Date of Patent: Apr. 14, 2015

(54) IMAGE CAPTURING DEVICES USING ORIENTATION DETECTORS TO IMPLEMENT AUTOMATIC EXPOSURE MECHANISMS

(71) Applicant: Apple Inc., Cupertino, CA (US)

(72) Inventors: Ralph Brunner, Cupertino, CA (US); Haitao Guo, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/942,313

(22) Filed: Jul. 15, 2013

(65) Prior Publication Data

US 2013/0300884 A1    Nov. 14, 2013

Related U.S. Application Data

(63) Continuation of application No. 12/479,746, filed on Jun. 5, 2009, now Pat. No. 8,493,453.

(51) Int. Cl.
| | |
|---|---|
| H04N 5/228 | (2006.01) |
| H04N 9/73 | (2006.01) |
| H04N 5/235 | (2006.01) |
| G03B 7/28 | (2006.01) |
| H04N 5/232 | (2006.01) |

(52) U.S. Cl.
CPC ............... *H04N 5/2353* (2013.01); *G03B 7/28* (2013.01); *G03B 2217/18* (2013.01); *H04N 5/23293* (2013.01); *H04N 5/2351* (2013.01); *H04N 5/23251* (2013.01)

(58) Field of Classification Search
None
See application file for complete search history.

(56) References Cited

U.S. PATENT DOCUMENTS

| 6,791,617 | B1 | 9/2004 | Nakamura | |
| 8,493,453 | B2 * | 7/2013 | Brunner et al. | 348/208.12 |
| 2002/0008771 | A1 | 1/2002 | Uchino et al. | |
| 2006/0204232 | A1 | 9/2006 | Weinberg et al. | |
| 2007/0160359 | A1 | 7/2007 | Imamura | |
| 2007/0263997 | A1 | 11/2007 | Hirai et al. | |
| 2007/0291152 | A1 * | 12/2007 | Suekane et al. | 348/333.02 |
| 2008/0050109 | A1 | 2/2008 | Noyes et al. | |
| 2008/0240694 | A1 | 10/2008 | Okazaki | |

(Continued)

FOREIGN PATENT DOCUMENTS

WO    WO 2006/083563 A2    8/2006

OTHER PUBLICATIONS

"Light meter" Wikipedia, http://en.wikipedia.org/wiki/Exposure_meter, Apr. 4, 2009, (7 pgs).

(Continued)

*Primary Examiner* — Lin Ye
*Assistant Examiner* — John H Morehead, III
(74) *Attorney, Agent, or Firm* — Blakely, Sokoloff, Taylor & Zafman LLP

(57) ABSTRACT

Several methods and apparatuses for implementing automatic exposure mechanisms for image capturing devices are described. In one embodiment, an orientation detector located in the device determines orientation data for the device. The automatic exposure mechanism projects an orientation vector into an image plane of an image sensor. Next, the automatic exposure mechanism adjusts an initial position of a metering area used for automatic exposure towards a target position based on the projected orientation vector. The automatic exposure mechanism optionally dampens the adjustment of the metering area.

21 Claims, 10 Drawing Sheets

(56) References Cited

U.S. PATENT DOCUMENTS

| | | |
|---|---|---|
| 2009/0073275 A1 | 3/2009 | Awazu |
| 2009/0175500 A1* | 7/2009 | Kizuki et al. ............... 382/103 |
| 2009/0202235 A1* | 8/2009 | Li et al. ............... 396/125 |
| 2009/0295926 A1* | 12/2009 | Miyazaki ............... 348/169 |
| 2010/0088532 A1 | 4/2010 | Pollock et al. |
| 2010/0226636 A1 | 9/2010 | Hirai et al. |
| 2012/0105684 A1 | 5/2012 | Nozaki et al. |
| 2012/0114179 A1* | 5/2012 | Okada et al. ............... 382/103 |

OTHER PUBLICATIONS

"Exposure (photography)" Wikipedia, http://en.wikipedia.org/wiki/Exposure_(photography), Apr. 21, 2009, (7 pgs).

"AutoExposure Algorithms for Digital Cameras" ImagEval, http://imageval.com/public/Products/ISET/ISET_Introduction/AutoExposure.htm, accessed on Apr. 16, 2009, (3 pgs).

* cited by examiner

IMAGE CAPTURING DEVICES USING ORIENTATION DETECTORS TO IMPLEMENT AUTOMATIC EXPOSURE MECHANISMS

This application is a continuation of co-pending U.S. application Ser. No. 12/479,746, filed on Jun. 5, 2009.

Embodiments of the invention are generally related to image capturing devices and more particularly to devices having orientation sensors to implement automatic exposure mechanisms.

BACKGROUND

Image capturing devices include cameras, portable handheld electronic devices, and other electronic devices. These image capturing devices can use an automatic exposure mechanism to automatically calculate and adjust exposure settings in order to match as closely as possible a subject's mid-tone to the mid-tone of the photograph. "Correct" exposure may be defined as an exposure that achieves the effect the photographer intended. The purpose of exposure adjustment (in combination with lighting adjustment) is to control the amount of light from the subject that is allowed to fall on the film or image sensor, so that it falls into an appropriate region of the characteristic curve of the film or image sensor and yields a "correct" or acceptable exposure. A photograph may be described as overexposed when it has a loss of highlight detail. This can result in the bright parts of an image being effectively all white. A photograph may be described as underexposed when it has a loss of shadow detail. This can result in the dark areas being indistinguishable from black.

Prior approaches use flat and center-weighted exposure metering for automatic exposure. These approaches are prone to fail in bright outdoor scenes because the automatic exposure mechanism attempts to expose for the bright sky and the darker ground equally. Thus, the subject often appears underexposed.

SUMMARY

Several methods and apparatuses for implementing automatic exposure mechanisms for image capturing devices are described. In one embodiment, an orientation detector located in the device determines orientation data (e.g., in 3-D) for the device. The automatic exposure mechanism projects an orientation vector into an image plane of an image sensor of the device. Next, the automatic exposure mechanism adjusts an initial position of a metering area, used for automatic exposure to a target position based on the projected orientation vector. The automatic exposure mechanism optionally dampens the adjustment of the metering area. The automatic exposure mechanism can then use the metering area at the target position to determine an exposure setting based on meter values in the metering area.

For example, a user may rotate the image capturing device from a landscape to a portrait orientation. The adjustment of the metering area in response to the projected vector may be dampened by a predetermined time period in order to avoid abrupt exposure changes or oscillations. Then, the automatic exposure mechanism determines exposure settings for a scene to be captured by the device using the adjustment. The metered area may be adjusted to reduce an amount of exposure to a bright section and/or increase an amount of exposure to a darker section or vice versa.

In another embodiment, a method for adjusting an exposure mechanism includes determining an orientation of an image capturing device using an orientation detector and adjusting (e.g., an automatic or a user prompted adjustment) a position of a metering area which is used to determine an exposure setting to capture an image.

Other embodiments are also described. Other features of the present invention will be apparent from the accompanying drawings and from the detailed description which follows.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several methods and apparatuses for implementing automatic exposure mechanisms for image capturing devices are described. In one embodiment, an orientation detector located in the device determines orientation data (e.g., 3-D acceleration) for the device. The automatic exposure mechanism projects an orientation vector into an image plane of an image sensor of the device. Next, the automatic exposure mechanism adjusts an initial position of a metering area, used for automatic exposure to a target position based on the projected orientation vector. The automatic exposure mechanism optionally dampens the adjustment of the metering area. The automatic exposure mechanism can then use the metering area at the target position to determine an exposure setting based on meter values in the metering area.

For example, a user may rotate the image capturing device from a landscape to a portrait orientation. The adjustment of the metering area in response to the projected vector may be dampened by a predetermined time period in order to avoid abrupt exposure changes or oscillations. Then, the automatic exposure mechanism determines exposure settings for a scene to be captured by the device using the adjustment. The metered area may be adjusted to reduce an amount of exposure to a bright section and/or increase an amount of exposure to a darker section or vice versa.

In another embodiment, a method for adjusting an exposure mechanism includes determining an orientation of an image capturing device using an orientation detector (e.g., an accelerometer, a gyroscope, a motion detector, a tilt sensor such as mercury switch, a compass, or any combination thereof) and adjusting (e.g., an automatic or a user prompted adjustment) a position of a metering area which is used to determine an exposure setting to capture an image.

In this section several preferred embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

Figure 1:
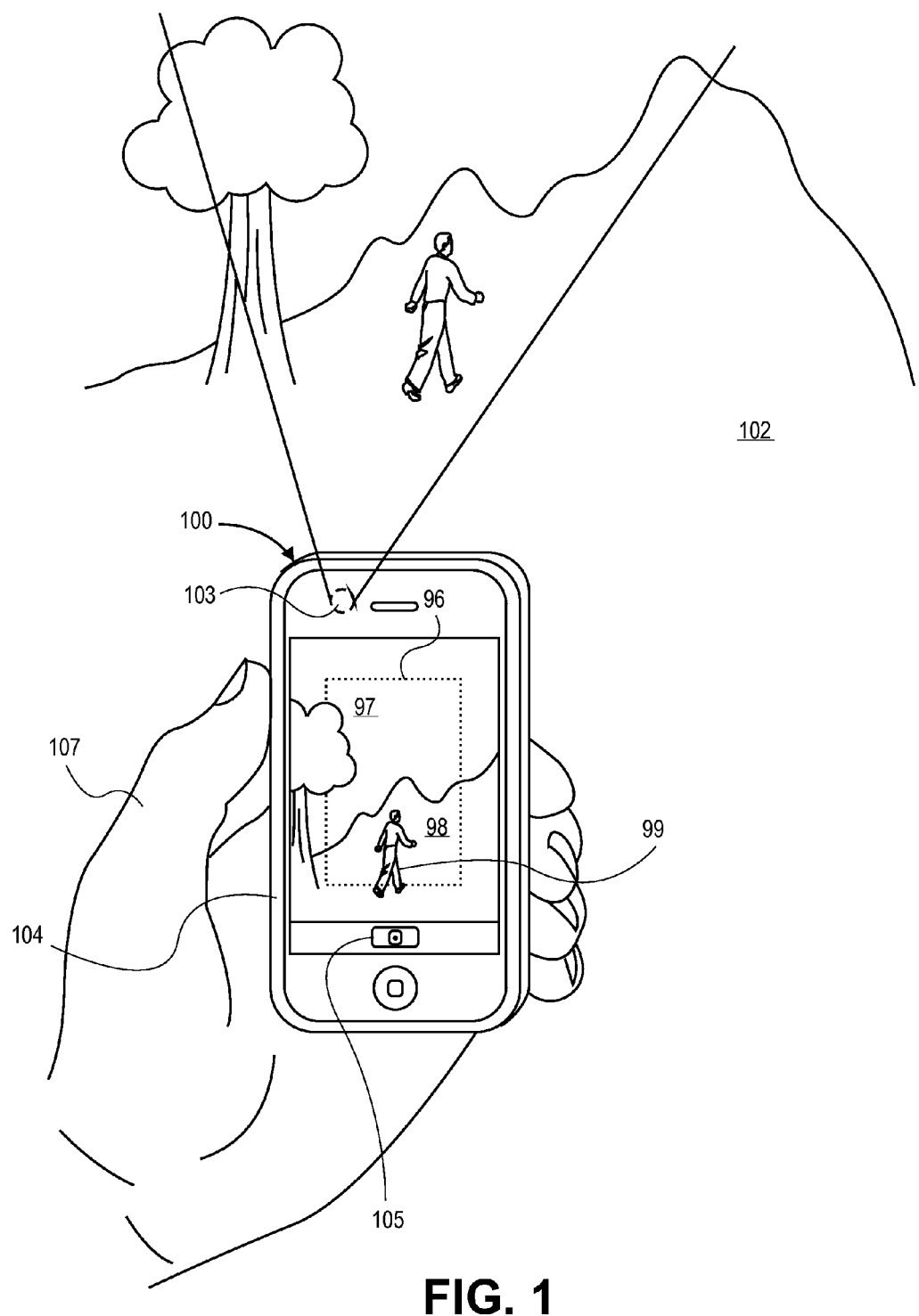
FIG. 1 shows a portable handheld device having a built-in digital camera and a touch sensitive screen, in accordance with one embodiment.

FIG. 1 shows a portable image capturing device 100 having a built-in digital camera in accordance with one embodiment. In this example, the portable device 100 is shown while it is held in the user's hand 107. The device 100 may be an IPHONE device by Apple Inc., of Cupertino, Calif. Alternatively, it could be any other electronic device that has a built-in digital camera. The built-in digital camera includes a lens 103 located in this example on the back face of the device 100. The lens may be a fixed optical lens system or it may have focus and optical zoom capability. Although not depicted in FIG. 1, inside the device 100 are an electronic image sensor and associated hardware circuitry and running software that can capture a digital still image or video of a scene 102 that is before the lens 103.

The digital camera functionality of the device 100 optionally includes an electronic or digital viewfinder. The viewfinder can display live, captured video or still images of the scene 102 that is before the camera, on a portion of the touch sensitive screen 104 as shown. In this case, the digital camera also includes a soft or virtual shutter button whose icon 105 is displayed by the screen 104, directly below the viewfinder image area. As an alternative or in addition, a physical shutter button may be implemented in the device 100. The device 100 includes all of the needed circuitry and/or software for implementing the digital camera functions of the electronic viewfinder, shutter release, and automatic exposure mechanism as described below.

In FIG. 1, the scene 102 is displayed on the screen. Upon execution of an automatic exposure mechanism, an initial metered area 96 is used by the device for determining exposure settings. The initial metered area 96 includes a brighter section 97 (e.g., bright sky) and a darker section (e.g., ground 98 along with the subject 99). A position of the metered area 96 may need to be adjusted to obtain optimum exposure settings and avoid over exposing or under exposing.

Figure 2:
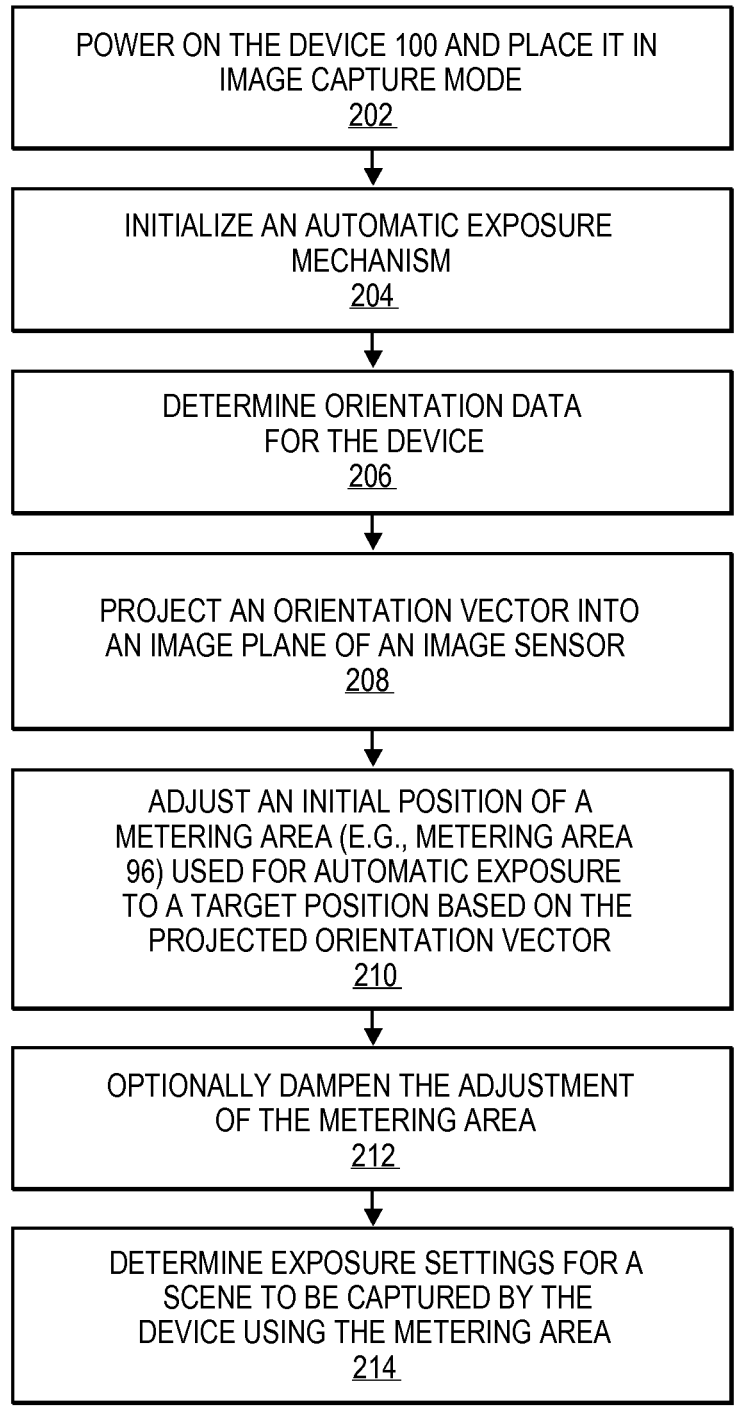
FIG. 2 illustrates a flow diagram of operations for an automatic exposure mechanism, in accordance with some embodiments.

FIG. 2 illustrates a flow diagram of operations for an automatic exposure mechanism, in accordance with some embodiments. After having powered on the device 100 and placing it in image capture mode at block 202, a view finder function begins execution which displays a still image or video of the scene 102 that is before the camera lens 103. The user aims the camera lens so that the desired portion of the scene appears on the preview portion of the screen 104. In one embodiment, a solid state image sensor is built into the device and may be located at a focal plane of an optical system that includes the lens. An optical image of a scene before the camera is formed on the image sensor, and the sensor responds by capturing the scene in the form of a digital image or picture consisting of pixels that will then be stored in memory.

An automatic exposure mechanism initiates at block 204 when the device is placed in the image capture mode. An orientation detector located in the device can determine orientation data for the device at block 206. The automatic exposure mechanism can project an orientation vector into an image plane of an image sensor that forms an image, which is to have an exposure measurement at block 208. Next, the automatic exposure mechanism can adjust an initial position of a metering area (e.g., metering area 96) used for automatic exposure to a target position based on the orientation vector at block 210. The automatic exposure mechanism optionally dampens the adjustment of the metering area at block 212. For example, a user may rotate the image capturing device from a landscape to a portrait orientation. The adjustment of the metering area in response to the projected vector may be dampened by a predetermined time period (e.g., 2 to 3 seconds) in order to avoid abrupt exposure changes or oscillations. Then, the automatic exposure mechanism determines exposure settings for a scene to be captured by the device using the metering area at block 214. The metered area may be adjusted to reduce an amount of exposure to a bright section and/or increase an amount of exposure to a darker section or vice versa.

In one embodiment, the orientation detector can be an accelerometer that provides device acceleration data (e.g., $a\_x$, $a\_y$, $a\_z$). The automatic exposure mechanism can project an acceleration vector into an image plane of the image sensor. The metering area position can be adjusted based on the acceleration vector. In some embodiments, the orientation detector also can be an accelerometer, a gyroscope, a motion detector, a tilt sensor such as mercury switch, a compass, or any combination thereof in single or multi physical packages.

In an embodiment, the orientation detector can be a motion detector that provides device motion data. The automatic exposure mechanism can project a motion vector into an image plane of the image sensor. The metering area position can be adjusted based on the motion vector. In some embodiments, the motion detector can be an accelerometer, a gyroscope, a tilt sensor such as mercury switch, a compass, or any combination thereof in single or multi physical packages.

Additional details of this auto exposure mechanism will be explained below. Once the exposure settings have been adjusted, the picture can be taken, for example, when the user gives the shutter release command.

Figure 3A:
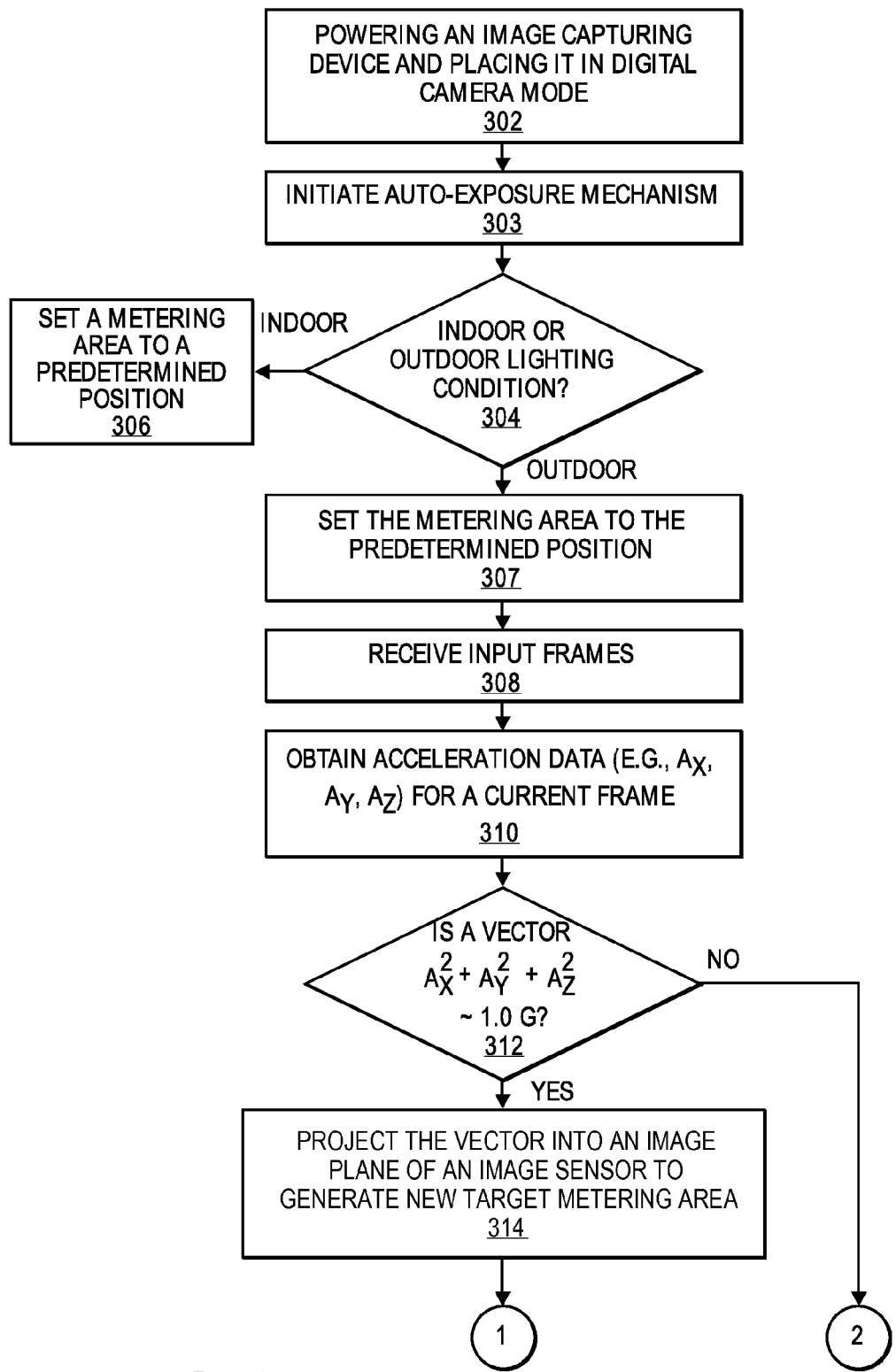
FIGS. 3A and 3B illustrate a detailed flow diagram of operations for the automatic exposure mechanism, in accordance with some embodiments.
Figure 3B:
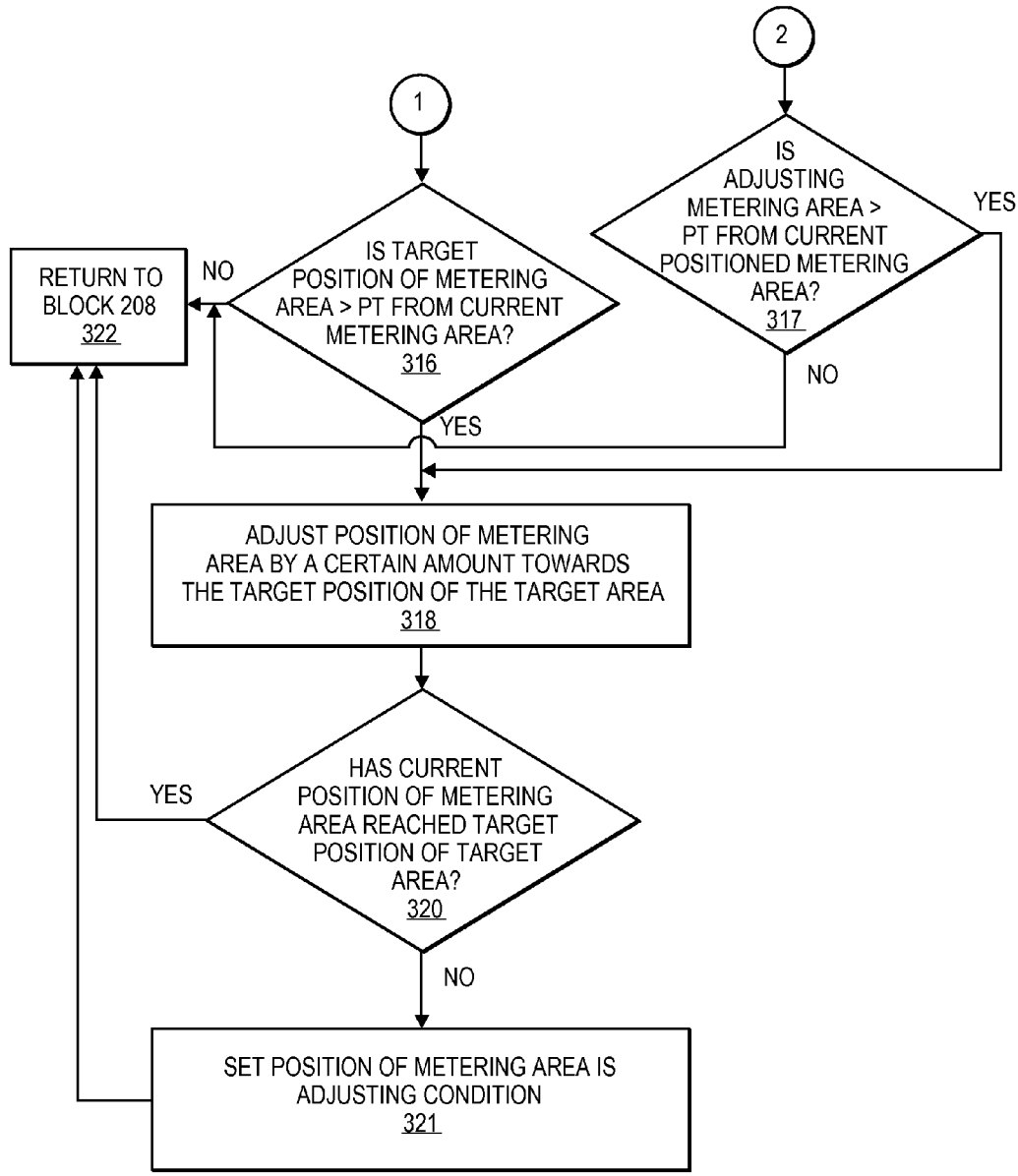
Figure 6:
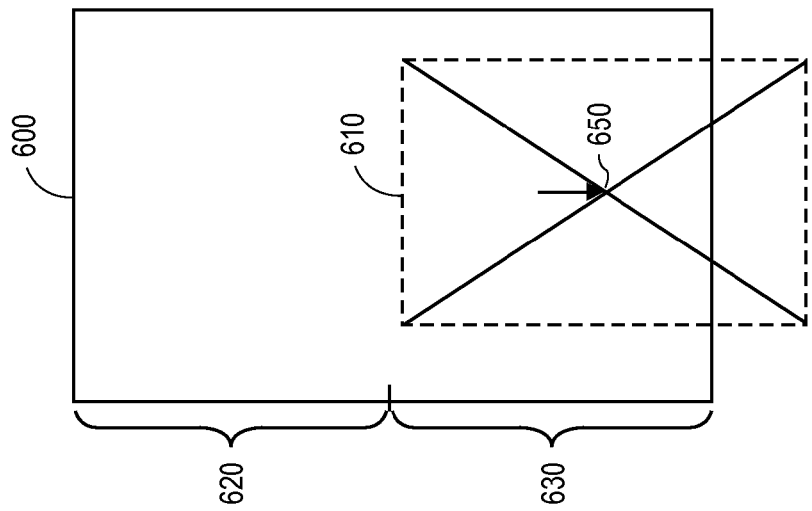
FIGS. 4-9 illustrate displays of image capturing devices with each display having a metering area, in accordance with some embodiments.
Figure 5:
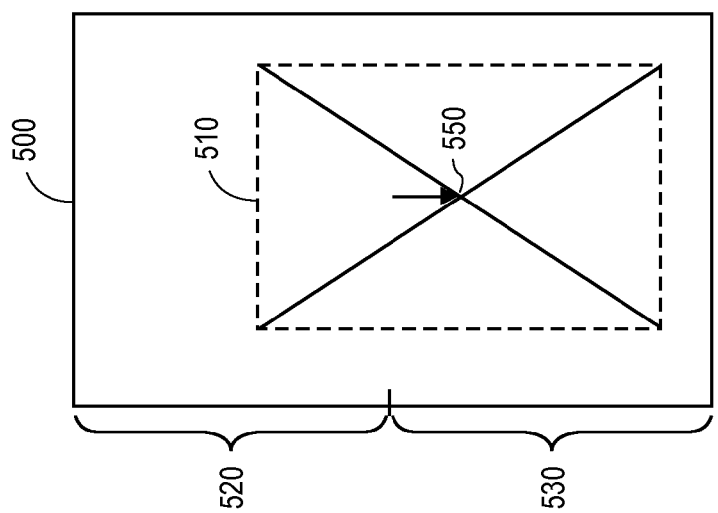

FIGS. 3A and 3B illustrate a detailed flow diagram of operations for the automatic exposure mechanism, in accordance with certain embodiments. A user of the device powers the device 100 and places it in digital camera mode at block 302. An automatic exposure mechanism initiates at block 304 when the device is placed in the digital camera mode. The automatic exposure mechanism, which may be executed by a processing circuit or processing logic, can determine whether the device is located inside or outside at block 304. In other words, is the device sensing an indoor or outdoor lighting condition at block 304. This determination may occur in various ways. The processing logic may include image sensors that detect illumination. The processing circuit or image processing circuitry can use the image data collected by the image sensors to determine a light product (e.g., exposure value) or a color temperature for the light received by the image sensors. The light product or color temperature then is used to determine whether the device is indoors or outdoors. Alternatively, an automatic white balancing process provides color information that can be used to determine whether the device is indoors or outdoors. In other embodiments, the device may include a global positioning system (GPS) that detects a GPS signal. The strength of the GPS signal indicates whether the device is indoors or outdoors.

If the device is located indoors, then an initial metering area can be set to a predetermined position based on the device being located indoors at block 306. If the device is located outdoors, then the automatic exposure mechanism can set the metering area to a predetermined initial position (e.g., metering area 96) at block 307. The processing logic sends and receives information to/from an image sensing unit having a microprocessor and image sensors. The processing logic may include hardware (circuitry, dedicated logic, etc.), software (such as is run on a general purpose computer system or a dedicated machine or a device), or a combination of both. The image sensing unit may send frames of metadata (e.g., focal-number, exposure time, white balance) to the processing logic at block 308. Pixel values are read from the image sensors to generate image data. Frames are sent at a certain time interval (e.g., 1/15 of a second) to the processing logic.

Next, the automatic exposure mechanism can obtain acceleration data from the accelerometer. In one embodiment, the accelerometer measures g-force along three orthogonal axes to generate a three-component vector, (e.g., $a\_x, a\_y, a\_z$), that represents the acceleration in three orthogonal axes. The processing logic adds the squared length of each component and can determine whether this value is substantially equal to 1 g-force upward with a certain tolerance (e.g., +/−5%) at block 312. A g-force of substantially 1 indicates that the device likely is stable. The acceleration data also indicates which direction is down relative to the display. The position of the metering area can then be moved by some predetermined amount in this direction with the assumption being that down is towards ground and a particular subject while up is towards a bright sky. In this way, the position of the metering area moves towards a subject to obtain proper exposure of the subject.

If the accelerometer indicates a g-force of substantially 1, then the automatic exposure mechanism can project the vector into an image plane of an image sensor (or focal plane of a lens) that forms an image to generate a target position for the metering area at block 314. The automatic exposure mechanism can determine whether the target position of the metering area is greater than a predetermined threshold (PT) (e.g., 2%) from the current metering position at block 316. If so, then the automatic exposure mechanism can adjust the current position of the metering area by a predetermined amount (e.g., 0.4%) towards the target position of the metering area at block 318.

Returning to block 312, if the accelerometer indicates a g-force of substantially more than or less than 1, then the device is likely moving and not stable. The automatic exposure mechanism can determine whether an adjusting position of the metering area is greater than a predetermined threshold (e.g., 2%) from the current metering position at block 317. If so, then the automatic exposure mechanism can adjust the current position of the metering area by a predetermined amount (e.g., 0.4%) towards the target position of the metering area at block 318.

Then, the automatic exposure mechanism can determine whether the current adjusted position of the metering area has substantially reached the target position of the metering area at block 320. If the current position is substantially equal to the target position, then the automatic exposure mechanism returns to block 308. If the current position is not substantially equal to the target position, then the automatic exposure mechanism can set a condition (e.g., flag) indicating that the position of the metering area is adjusting at block 321. Then, the automatic exposure mechanism returns to block 308. The target position is computed every frame and the position of the current metering area is chasing this target position until it reaches the target once. Then, the position of the metering area will only start to move again if the target position is more than the threshold value away from the current position of the metering area.

Alternatively, other information provided by the device can be used to determine how to adjust a metering area for optimum exposure conditions. For example, a known time and location of the device from the GPS can be used to determine a position of the sun. Then, the automatic exposure mechanism can decide how to adjust the metering area based on this information.

In an embodiment, the automatic exposure mechanism may display a horizon line on the screen 104. In another embodiment, a user can draw or gesture an intended metering area.

Figure 4:
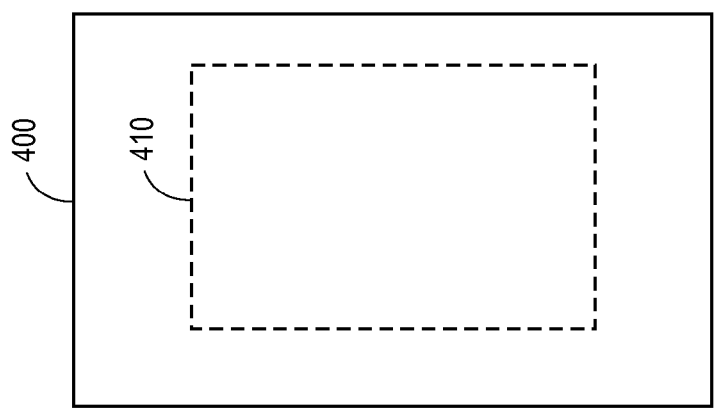
Figure 7:
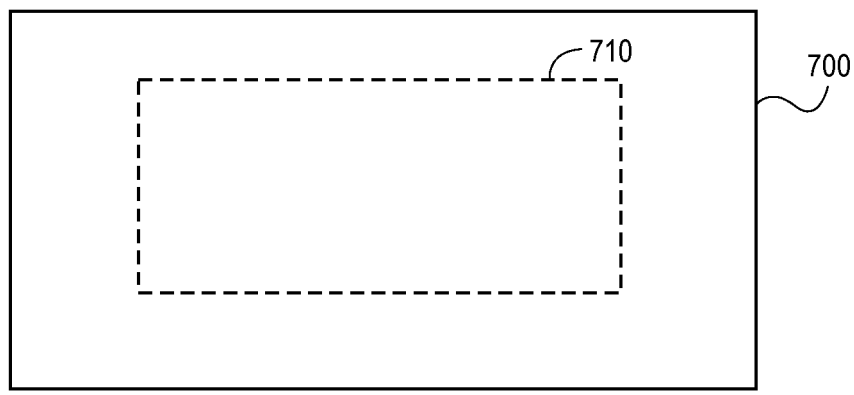
Figure 8:
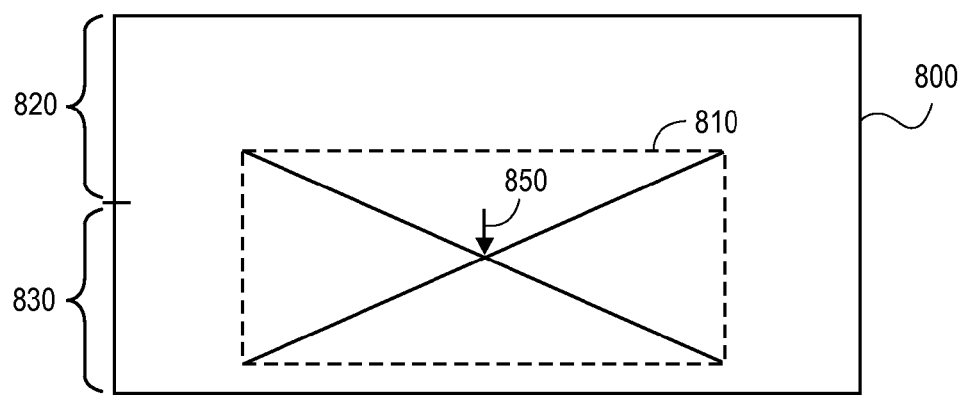

FIGS. 4-9 illustrate displays of image capturing devices with each display having a metering area in accordance with some embodiments. FIG. 4 illustrates a display 400 with a metering area 410 centered with respect to the display 400. Metering area 410 is centered in a manner similar to the metering area 96 of FIG. 1. Upper sections 520, 620, and 820 of the displays in FIGS. 5, 6, and 8, respectively may represent a bright portion of a scene to be captured (e.g., bright sky). Lower sections 530, 630, and 830 of the displays may represent a dark portion of the scene to be captured (e.g., ground, subject). Metering areas 510 and 610 represent metering areas that have been adjusted in position with respect to an initial centered metering area 410 for portrait orientations illustrated in FIGS. 4-6. Similarly, metering area 810 represents a metering area that has been adjusted in position with respect to an initial centered metering area 710 for landscape orientations illustrated in FIGS. 7 and 8.

The automatic exposure mechanism described above may begin with a predetermined initial position of a metering area (e.g., metering area 410, 710) in the absence of acceleration data. Then, the automatic exposure mechanism calculates a target position of a target area (e.g., metering area 510, 610, 810) based on acceleration data that indicates a downward pointing vector (e.g., 550, 650, 850). The metering areas 510, 610, and 810 are centered with respect to an end of the vectors 550, 650, and 850, respectively. The metering area 610 extends beyond the screen 600. In this case, the metering area will be truncated at the bottom edge of the screen 600. The automatic exposure mechanism assumes that a downward pointing vector, which represent the Earth's gravity vector, indicates a less bright or dark lower section (e.g., 530, 630, 830) of a scene and a bright upper section (e.g., 520, 620, 820) of the scene.

Figure 9:
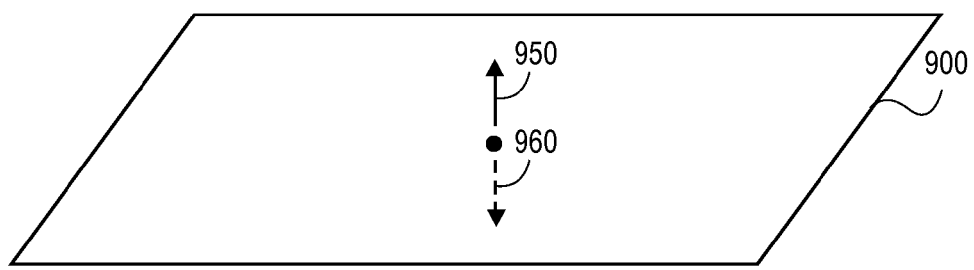

FIG. 9 illustrates a device oriented parallel with a horizontal surface according to one embodiment. In this case, a projected acceleration vector has no component in the plane of the screen 900. The acceleration vector points upward (e.g., vector 950) or downward (e.g., vector 960) depending on whether the device faces upwards or downwards. A metering area is set to a centered position with respect to the screen because no component of the projected vector lies in the plane of the screen.

Many of the methods in embodiments of the present invention may be performed with a digital processing system, such as a conventional, general-purpose computer system. Special purpose computers, which are designed or programmed to perform only one function, may also be used.

Figure 10:
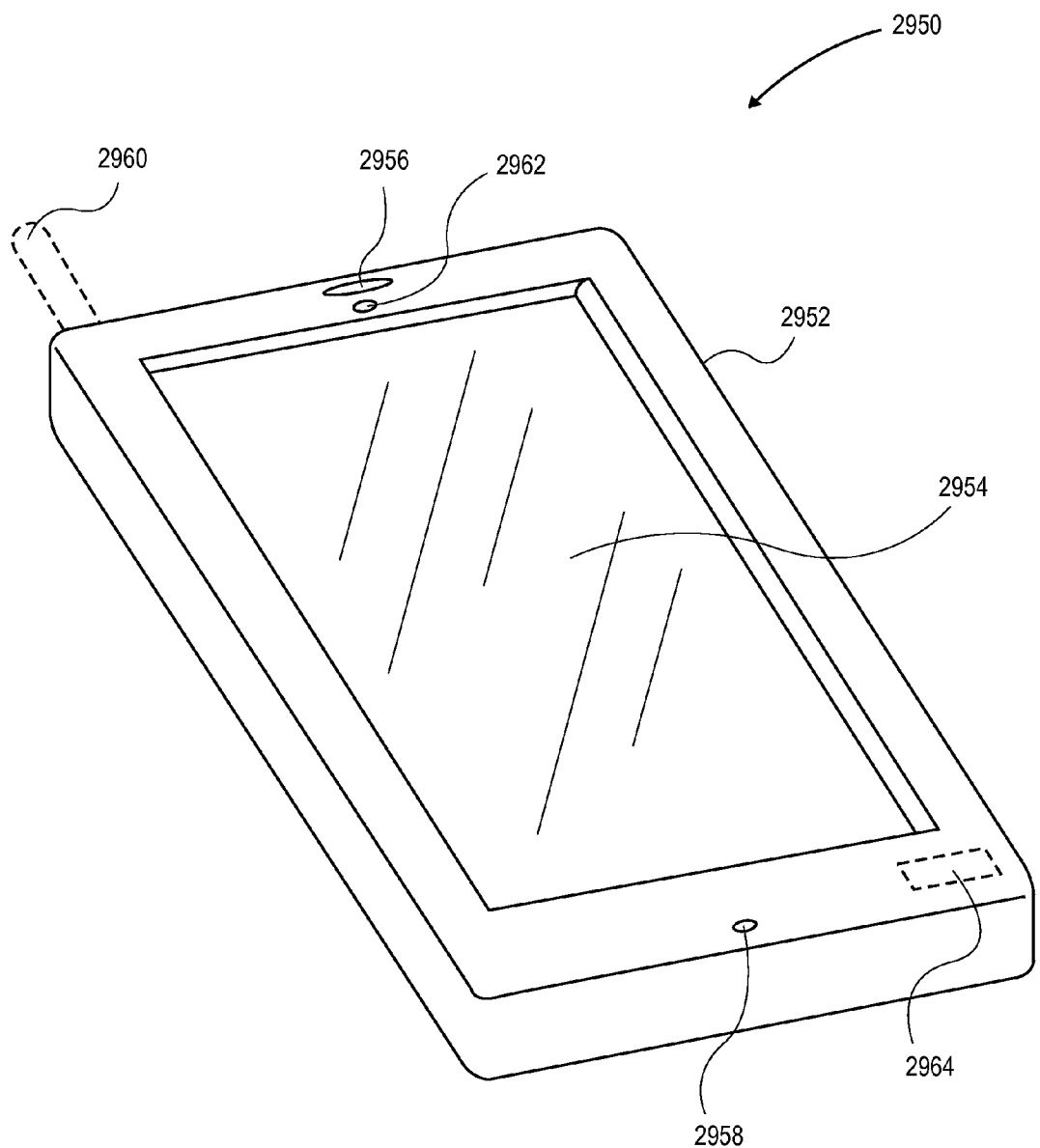
FIG. 10 shows an image capturing device 2950, in accordance with one embodiment.
Figure 11:
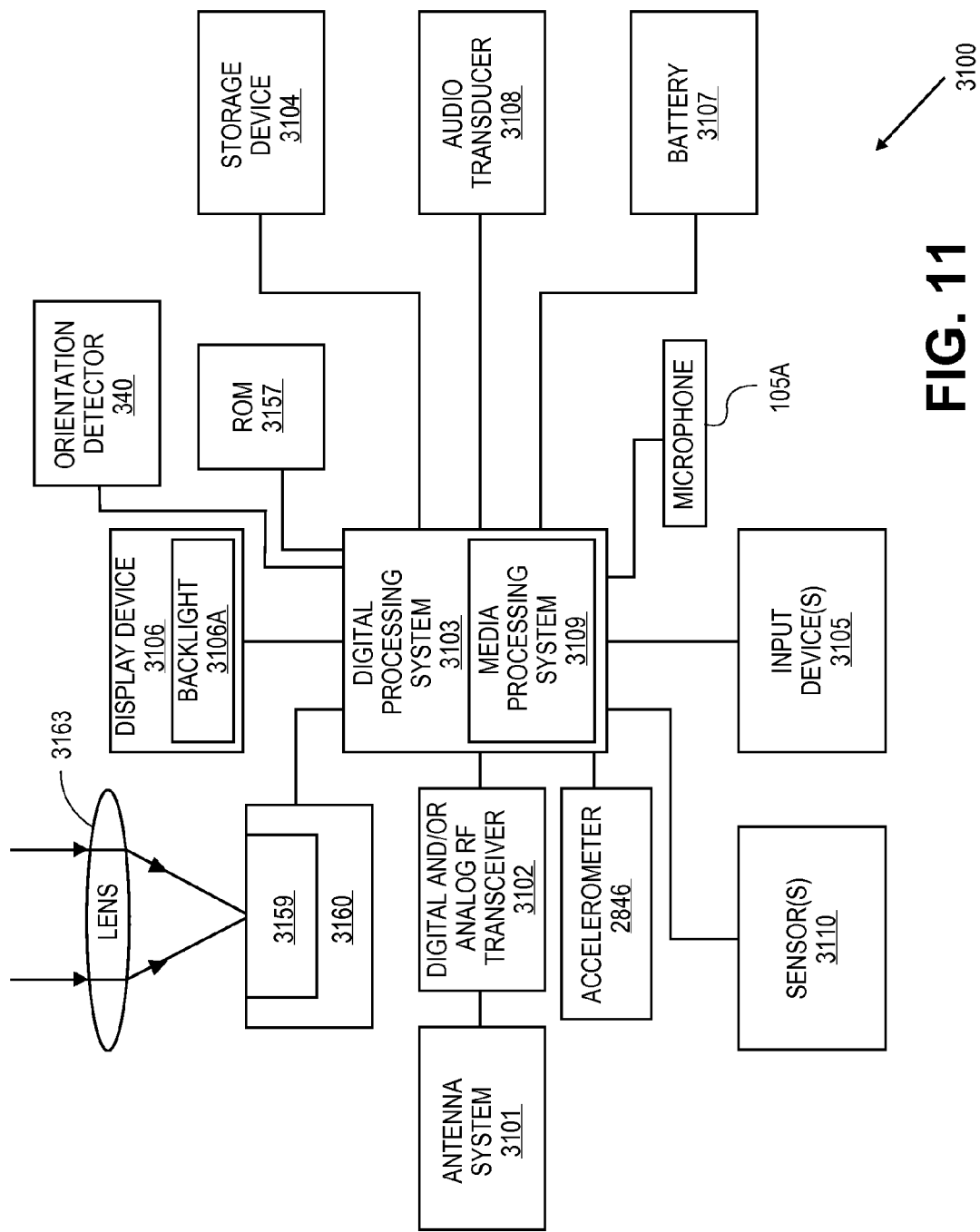
FIG. 11 shows an embodiment of a wireless image capturing device.
Figure 12:
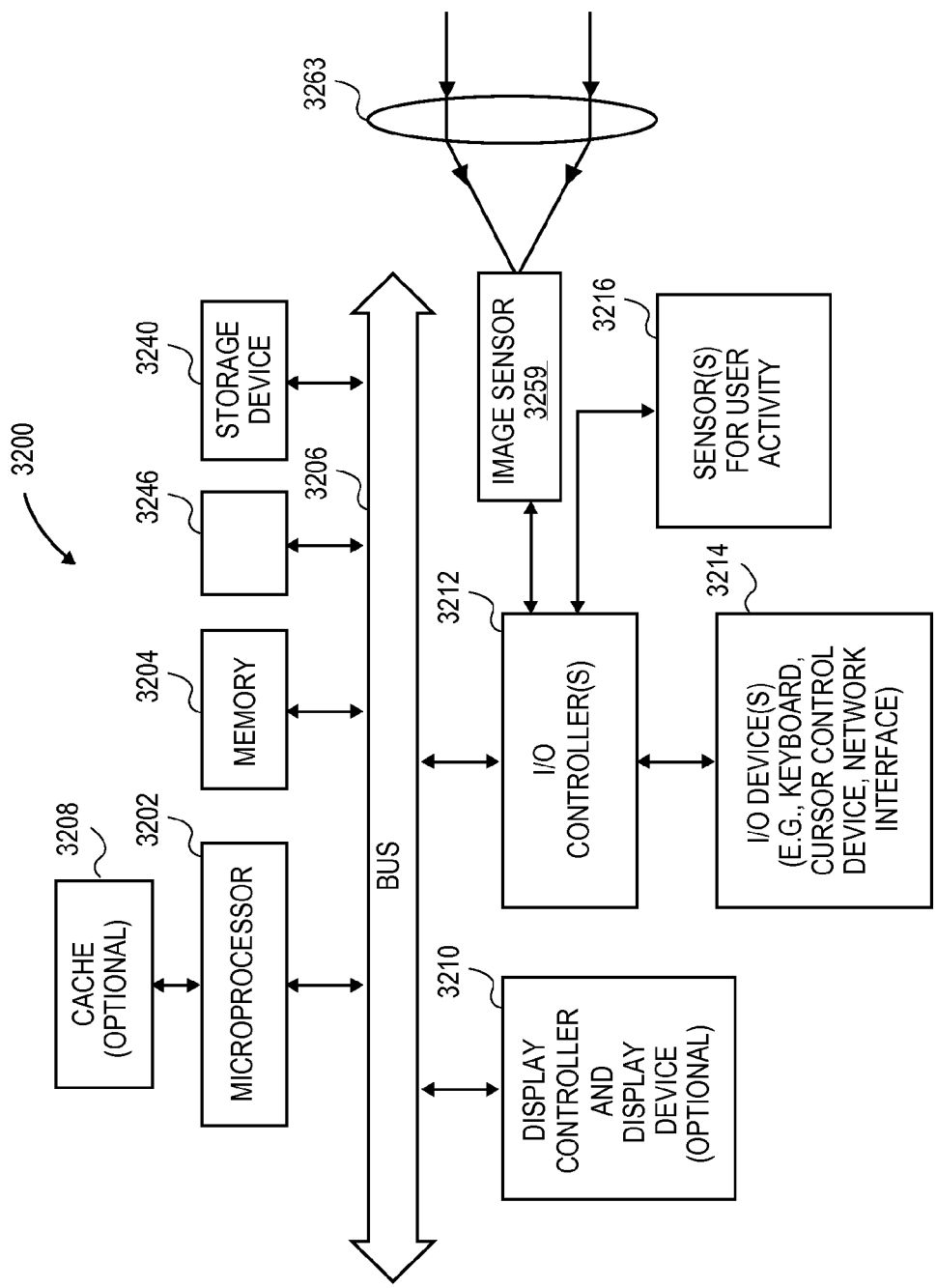
FIG. 12 shows an example of a data processing system, according to an embodiment.

In some embodiments, the methods, systems, and apparatuses of the present disclosure can be implemented in various devices including electronic devices, consumer devices, data processing systems, desktop computers, portable computers, wireless devices, cellular devices, tablet devices, handheld devices, multi touch devices, multi touch data processing systems, any combination of these devices, or other like devices. FIGS. 10-12 illustrate examples of a few of these devices, which are capable of capturing still images and video to implement the methods of the present disclosure.

FIG. 10 shows an image capturing device 2950 in accordance with one embodiment of the present invention. The device 2950 may include a housing 2952, a display/input device 2954, a speaker 2956, a microphone 2958 and an optional antenna 2960 (which may be visible on the exterior of the housing or may be concealed within the housing). The device 2950 also may include a proximity sensor 2962 and an accelerometer 2964. The device 2950 may be a cellular telephone or a device which is an integrated PDA and a cellular telephone or a device which is an integrated media player and a cellular telephone or a device which is both an entertainment system (e.g. for playing games) and a cellular telephone, or the device 2950 may be other types of devices described herein. In one particular embodiment, the device 2950 may include a cellular telephone and a media player and a PDA, all contained within the housing 2952. The device 2950 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer, an iPhone, and an iPod are portable devices.

In certain embodiments of the present disclosure, the device 2950 can be used to implement at least some of the methods discussed in the present disclosure.

FIG. 11 shows an embodiment of a wireless image capturing device which includes the capability for wireless communication and for capturing images. Wireless device 3100 may include an antenna system 3101. Wireless device 3100 may also include a digital and/or analog radio frequency (RF) transceiver 3102, coupled to the antenna system 3101, to transmit and/or receive voice, digital data and/or media signals through antenna system 3101.

Wireless device 3100 may also include a digital processing system 3103 to control the digital RF transceiver and to manage the voice, digital data and/or media signals. Digital processing system 3103 may be a general purpose processing system, such as a microprocessor or controller for example. Digital processing system 3103 may also be a special purpose processing system, such as an ASIC (application specific integrated circuit), FPGA (field-programmable gate array) or DSP (digital signal processor). Digital processing system 3103 may also include other devices, as are known in the art, to interface with other components of wireless device 3100. For example, digital processing system 3103 may include analog-to-digital and digital-to-analog converters to interface with other components of wireless device 3100. Digital processing system 3103 may include a media processing system 3109, which may also include a general purpose or special purpose processing system to manage media, such as files of audio data.

Wireless device 3100 may also include a storage device 3104, coupled to the digital processing system, to store data and/or operating programs for the Wireless device 3100. Storage device 3104 may be, for example, any type of solid-state or magnetic memory device. Storage device 3104 may be or include a machine-readable medium.

A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

Wireless device 3100 may also include one or more input devices 3105, coupled to the digital processing system 3103, to accept user inputs (e.g., telephone numbers, names, addresses, media selections, etc.) Input device 3105 may be, for example, one or more of a keypad, a touchpad, a touch screen, a pointing device in combination with a display device or similar input device.

Wireless device 3100 may also include at least one display device 3106, coupled to the digital processing system 3103, to display information such as messages, telephone call information, contact information, pictures, movies and/or titles or other indicators of media being selected via the input device 3105. Display device 3106 may be, for example, an LCD display device. In one embodiment, display device 3106 and input device 3105 may be integrated together in the same device (e.g., a touch screen LCD such as a multi-touch input panel which is integrated with a display device, such as an LCD display device). The display device 3106 may include a backlight 3106A to illuminate the display device 3106 under certain circumstances. It will be appreciated that the wireless device 3100 may include multiple displays.

Wireless device 3100 may also include a battery 3107 to supply operating power to components of the system including digital RF transceiver 3102, digital processing system 3103, storage device 3104, input device 3105, microphone 3105A, audio transducer 3108, media processing system 3109, sensor(s) 3110, and display device 3106, an image sensor 3159 (e.g., CCD (Charge Coupled Device), CMOS sensor). The image sensor may be integrated with an image processing unit 3160. The display device 3106 may include a Liquid Crystal Display (LCD) which may be used to display images which are captured or recorded by the wireless image capturing device 3100. The LCD serves as a viewfinder of a camera and there may optionally be other types of image display devices on device 3100 which can serve as a viewfinder.

The device 3100 also includes an imaging lens 3163 which can be disposed over image sensor 3159. The processing system 3103 controls the operation of the device 3100; and, it may do so by executing a software program stored in ROM 3157, or in the processing system 3103, or in both ROM 3157 and the processing system 3103.

The processing system 3103 controls the image processing operation; and, it controls the storage of a captured image in storage device 3104. The processing system 3103 also controls the exporting of image data (which may or may not be color corrected) to an external general purpose computer or special purpose computer.

The processing system 3103 also responds to user commands (e.g., a command to "take" a picture or video by capturing image(s) on the image sensor and storing it in memory or a command to select an option for contrast enhancement and color balance adjustment).

The ROM 3157 may store software instructions for execution by the processing system 3103 to perform the automatic exposure mechanisms discussed in the present disclosure. The automatic exposure mechanism may determine acceleration data for the device using the accelerometer 2846, project an acceleration vector into an image plane of an image sensor based on the acceleration data, and adjust a first position of a metering area used for automatic exposure to a target position based on the acceleration vector.

The storage device 3104 is used to store captured/recorded images which are received from the CCD 3159. It will be appreciated that other alternative architectures of a camera can be used with the various embodiments of the invention.

Battery 3107 may be, for example, a rechargeable or non-rechargeable lithium or nickel metal hydride battery. Wireless device 3100 may also include audio transducers 3108, which may include one or more speakers, and at least one microphone 3105A, and an accelerometer 2846.

According to one embodiment, the accelerometer 2846 is able to detect an acceleration or deceleration of the wireless device 3100. The accelerometer 2846 may generate acceleration data for multiple dimensions. For example, the accelerometer 2846 may generate X, Y and Z axis acceleration information when the accelerometer 2846 detects that the portable device is moved. This acceleration information can be used to determine Earth's gravity vector and the orientation of the device with respect to the gravity vector.

In addition, the processing system is coupled to the accelerometer(s) 2846. The processing system may be used to project an acceleration vector into an image plane of an image sensor that forms an image. The processing system may be integrated with the accelerometer 2846 or integrated with other components, such as, for example, a chipset of a microprocessor, of the portable device.

In some embodiments, the image capturing device 3100 includes the storage device 3104 to store a plurality of captured images, the lens 3163 to receive incident light associated with an image to be captured, and the processing system 3103 coupled to the storage device 3104. The processing system 3103 may be configured to perform an automatic exposure mechanism that can determine acceleration data for the device, can adjust a first position of a metering area used for automatic exposure to a second position based on the acceleration data, and can determine an exposure for a scene captured by the device using the metering area.

The processing system 3103 may also be configured to detect a downward direction relative a display of the device by projecting an acceleration vector into a focal plane of an optical system with the acceleration vector being based on the acceleration data. The processing system may be configured to determine a target position of the metering area based on the acceleration data. In one embodiment, the processing circuit is configured to adjust the metering area from the first position to the second position towards the target position.

The device may further include a camera (e.g., lens 3163 and image sensor 3159) coupled to the processing system 3103 with the processing system 3104 being configured to detect if the lens is pointed in the downward direction or in an upward direction opposite the downward direction. The processing system 3103 may be configured to adjust the metering area back to the first position if the camera or lens is pointed in the downward direction or in the upward direction.

In other embodiments, the device 3100 also includes an orientation detector 3140 (e.g., accelerometer, gyroscope, motion detector, tilt sensor such as a mercury switch, compass, or any combination thereof) for determining an orientation of the device 3100. The processing system 3103 may be configured to perform an automatic exposure mechanism that can determine, through the orientation detector 3140, an orientation of the image capturing device 3100. The processing system 3103 may be configured to determine a target position of the metering area based on the orientation of the device. The processing system 3103 may be configured to adjust automatically a position of a metering area which is used to determine an exposure setting to capture an image. A few possible orientations are illustrated in FIGS. 4-9. The processing system 3103 may be configured to determine whether the automatically adjusted position is substantially equal to or within a predetermined threshold of the target position. The position is automatically adjusted until being substantially equal or within the predetermined threshold of the target position.

FIG. 12 shows an example of a data processing system according to an embodiment of the present invention. This data processing system 3200 may include a processor, such as microprocessor 3202, and a memory 3204, which are coupled to each other through a bus 3206. The data processing system 3200 may optionally include a cache 3208 which is coupled to the microprocessor 3202. The data processing system may optionally include a storage data processing system 3240 which may be, for example, any type of solid-state or magnetic memory data processing system. Storage data processing system 3240 may be or include a machine-readable medium.

This data processing system may also optionally include a display controller and display data processing system 3210 which is coupled to the other components through the bus 3206. One or ore input/output controllers 3212 are also coupled to the bus 3206 to provide an interface for input/output data processing systems 3214 and to provide an interface for one or more sensors 3216 which are for sensing user activity. The bus 3206 may include one or more buses connected to each other through various bridges, controllers, and/or adapters as is well known in the art. The input/output data processing systems 3214 may include a keypad or keyboard or a cursor control data processing system such as a touch input panel. Furthermore, the input/output data processing systems 3214 may include a network interface which is either for a wired network or a wireless network (e.g. an RF transceiver). The sensors 3216 may be any one of the sensors described herein including, for example, a proximity sensor or an ambient light sensor. In at least certain implementations of the data processing system 3200, the microprocessor 3202 may receive data from one or more sensors 3216 or from image sensor 3259 or from accelerometer 3246 and may perform the analysis of that data in the manner described herein. Image sensor 3259 captures an image via light focused by lens 3263.

In certain embodiments of the present disclosure, the data processing system 3200 can be used to implement at least some of the methods discussed in the present disclosure.

Figure 13:
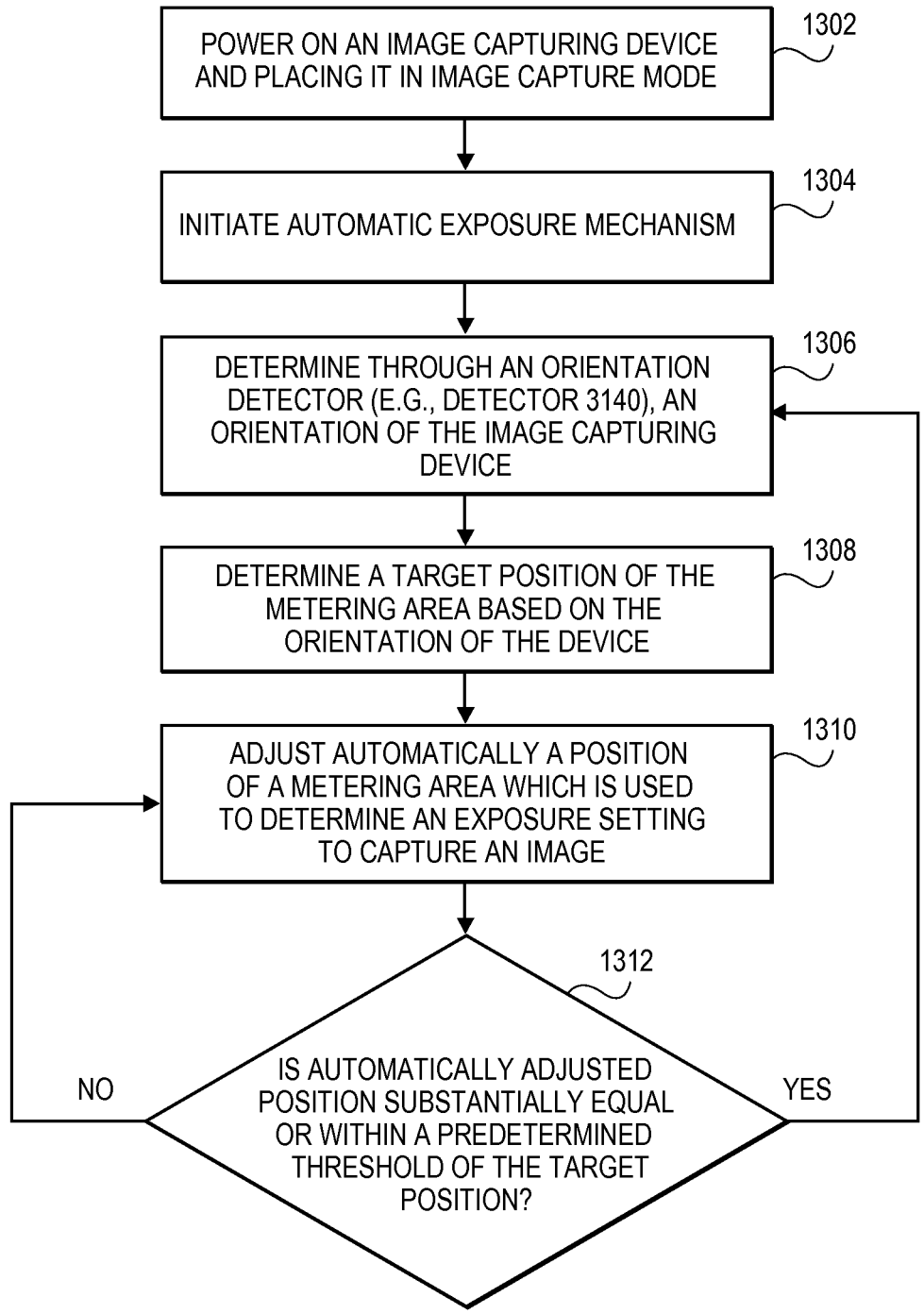
FIG. 13 illustrates a flow diagram of operations for an automatic exposure mechanism, in accordance with other embodiments.

FIG. 13 illustrates a flow diagram of operations for an automatic exposure mechanism, in accordance with other embodiments. After having powered on an image capturing device and placing it in image capture mode at block 1302, a view finder function begins execution which displays video or a still image of a scene that is before a camera lens. The user aims the camera lens so that the desired portion of the scene appears on the preview portion of a screen. An automatic exposure mechanism initiates at block 1304 when the device is placed in the image capture mode.

The automatic exposure mechanism can determine, through an orientation detector (e.g., detector 3140), an orientation of the image capturing device at block 1306. In one embodiment, the orientation detector can determine a downward direction, which is used to determine the orientation of the device. The automatic exposure mechanism can determine a target position of the metering area based on the orientation of the device at block 1308. The automatic exposure mechanism can adjust automatically a position of a metering area which is used to determine an exposure setting to capture an image at block 1310. The automatic exposure mechanism can determine whether the automatically adjusted position is substantially equal or within a predetermined threshold (e.g., 2%) of the target position at block

1312. The position is automatically adjusted until being substantially equal or within the predetermined threshold of the target position. Once the target position is reached, the mechanism can return to block 1306.

The methods of the present invention can be implemented using dedicated hardware (e.g., using Field Programmable Gate Arrays, or Application Specific Integrated Circuit, which many be integrated with image sensors, such as CCD or CMOS based image sensors) or shared circuitry (e.g., microprocessors or microcontrollers under control of program instructions stored in a machine readable medium, such as memory chips) for an imaging device, such as device 3100 in FIG. 11. The methods of the present invention can also be implemented as computer instructions for execution on a data processing system, such as system 3200 of FIG. 12.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to implement an automatic exposure mechanism, the method comprising:
   determining whether an image data is collected indoors or outdoors, wherein the image data is collected by an image sensor of a device;
   setting a current position of a metering area to a predetermined position on an image plane of the image sensor, wherein the metering area is used by an automatic exposure mechanism of the device to set an exposure time to collect the image data based on one or more meter values in the metering area;
   determining a downward pointing gravity vector based on an orientation data from an orientation detector of the device, wherein the orientation data indicates an orientation of the device relative to the downward pointing gravity vector;
   projecting the downward pointing gravity vector onto the image plane of the image sensor;
   calculating a target position for the metering area on the image plane of the image sensor, wherein the target position is in a direction of the projected downward pointing gravity vector; and
   moving, in response to determining the image data is collected outdoors, the current position of the metering area on the image plane of the image sensor from the predetermined position toward the calculated target position in the direction of the projected downward pointing gravity vector.

2. The method of claim 1, wherein the predetermined position is centered with respect to a display of the image data, and wherein the target position is off-center with respect to the display of the image data.

3. The method of claim 1, wherein the orientation data indicates the orientation of the device relative to a horizon.

4. The method of claim 1, wherein the orientation data includes motion data for the device.

5. The method of claim 1 further comprising, determining, based on the orientation data, whether the device is stable.

6. The method of claim 5, wherein the device is determined to be stable when the orientation data indicates a g-force value of one acting on the device.

7. The method of claim 1 further comprising damping, by a predetermined time period, the moving of the current position of the metering area from the predetermined position toward the target position.

8. A non-transitory machine readable medium containing executable computer program instructions which, when executed by a data processing system, causes the system to perform a method, the method comprising:
   determining whether an image data is collected indoors or outdoors, wherein the image data is collected by an image sensor of a device;
   setting a current position of a metering area to a predetermined position on an image plane of the image sensor, wherein the metering area is used by an automatic exposure mechanism of the device to set an exposure time to collect the image data based on one or more meter values in the metering area;
   determining a downward pointing gravity vector based on an orientation data from an orientation detector of the device, wherein the orientation data indicates an orientation of the device relative to the downward pointing gravity vector;
   projecting the downward pointing gravity vector onto the image plane of the image sensor;
   calculating a target position for the metering area on the image plane of the image sensor, wherein the target position is in a direction of the projected downward pointing gravity vector; and
   moving, in response to determining the image data is collected outdoors, the current position of the metering area on the image plane of the image sensor from the predetermined position toward the calculated target position in the direction of the projected downward pointing gravity vector.

9. The medium of claim 8, wherein the predetermined position is centered with respect to a display of the image data, and wherein the target position is off-center with respect to the display of the image data.

10. The medium of claim 8, wherein the orientation data indicates the orientation of the device relative to a horizon.

11. The medium of claim 8, wherein the orientation data includes motion data for the device.

12. The medium of claim 8 further comprising, determining, based on the orientation data, whether the device is stable.

13. The medium of claim 12, wherein the device is determined to be stable when the orientation data indicates a g-force value of one acting on the device.

14. The medium of claim 8 further comprising damping, by a predetermined time period, the moving of the current position of the metering area from the predetermined position toward the target position.

15. A device for implementing an automatic exposure mechanism, comprising:
   a storage device to store an image data and an orientation data, wherein the image data is collected by an image sensor of a device, and wherein the orientation data indicates an orientation of the device relative to a downward pointing gravity vector; and
   a processing system coupled to the storage device, the processing system configured to:
     determine whether the image data is collected indoors or outdoors;
     set a current position of a metering area to a predetermined position on an image plane of the image sensor, wherein the metering area is used by an automatic exposure mechanism of the device to set an exposure time to collect the image data based on one or more meter values in the metering area, determine a change in orientation of the device based on the orientation data, determine the downward pointing gravity vector based on the orientation data, project the downward pointing gravity vector onto the image plane of the image sensor, calculate a target position for the metering area on the image plane of the image sensor, wherein the target position is in a direction of the projected downward pointing gravity vector, and move, in response to determining the image data is collected outdoors and in response to determining the change in orientation of the device, the current position of the metering area on the image plane of the image sensor from the predetermined position toward the calculated target position in the direction of the projected downward pointing gravity vector.

16. The device of claim 15 further comprising, a display to display the image data, wherein the predetermined position is centered with respect to the display of the image data, and wherein the target position is off-center with respect to the display of the image data.

17. The device of claim 15, wherein the orientation data indicates the orientation of the device relative to a horizon.

18. The device of claim 15, wherein the orientation data includes motion data for the device.

19. The device of claim 15, wherein the processing system is further configured to determine, based on the orientation data, whether the device is stable.

20. The device of claim 19, wherein the device is determined to be stable when the orientation data indicates a g-force value of one acting on the device.

21. The device of claim 15, wherein the processing system is further configured to dampen, by a predetermined time period, the moving of the current position of the metering area from the predetermined position toward the target position.

* * * * *